US006549034B1

(12) United States Patent
Pietrzyk et al.

(10) Patent No.: US 6,549,034 B1
(45) Date of Patent: Apr. 15, 2003

(54) PROGRAMMABLE LOGIC CONTROLLER FOR SAFETY SYSTEMS WITH REDUCED CROSS-WIRING

(75) Inventors: Arthur Paul Pietrzyk, Thompson, OH (US); Thomas Sugimoto, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/034,387

(22) Filed: Dec. 27, 2001

(51) Int. Cl.[7] ............................................. H03K 19/173
(52) U.S. Cl. ............................................ 326/38; 326/10
(58) Field of Search ........................ 710/305; 714/1, 714/25, 47, 48; 326/9, 10, 37, 38

(56) References Cited

U.S. PATENT DOCUMENTS

| | | | | |
|---|---|---|---|---|
| 5,392,424 A | * | 2/1995 | Cook | 395/575 |
| 5,910,778 A | | 6/1999 | Klein et al. | |
| 2002/0083364 A1 | * | 6/2002 | Christensen et al. | 714/13 |
| 2002/0152419 A1 | * | 10/2002 | McLoughlin et al. | 714/11 |

FOREIGN PATENT DOCUMENTS

EP    0 977 391 A2    2/2000

OTHER PUBLICATIONS

CANopen Safety: Safety–relevant communication, elektroniknet, Dec. 15, 2000 (Abstract).
Controller Area Network (CAN), Philips, International CAN Conference, Las Vegas, Dec. 3–5, 2001 (Abstract).
Microcontrollers, Philips, Apr. 13, 2001 (Abstract).
K. Cevik, CANopen SIG Safety, Fachhochschule Bielefeld, University of Applied Sciences, vol. 1, pp. 1–11, 1999.
D.A. Glanzer, "Interoperable Fieldbus Devices: A Technical Overviews," ISA Transactions 35, 147–151, 1996.
EBUS 6000 Product List, Safenet Information, pp. 1.0–10.00, 1999.
Pilz, Safe Bus Systems, pp. 5–20, 1998.
Pilz, Review Extract, pp. 1–8, 1999.
Profisafe . . . in order to protect, 1999.
Profibus, Fail Safe with Profibus, pp. 1–57, 1999.
Appendix A German Safety Bus Committee Specification, Draft Proposal of a Guideline for the Test and Certfication on "Bus Systems for the Transmission of Safety Relevant Messages," Fachausschuss Elektrotechnik, Gustav–Heinemann–Ufer 130, 1999.

* cited by examiner

*Primary Examiner*—Don Le
(74) *Attorney, Agent, or Firm*—Keith M. Baxter; Alexander M. Gerasimow; R. Scott Speroff

(57) ABSTRACT

A safety system programmable logic controller provides for cross connection of inputs and outputs of separate independent control modules through the use of virtual wire connections passing as messages on a single logical backplane. The backplane executes a high level protocol that provides wire-like indications of communication failures mimicking those of separate physical wires.

34 Claims, 3 Drawing Sheets

PROGRAMMABLE LOGIC CONTROLLER FOR SAFETY SYSTEMS WITH REDUCED CROSS-WIRING

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to programmable logic controllers (PLC's) and in particular to a PLC finding specific application in safety systems.

PLC's are special purpose computers used for the control of industrial processes and the like. During the execution of a stored control program, they read inputs from the controlled process and, per the logic of the control program, provide outputs to the controlled process. The outputs typically provide analog or binary voltages or "contacts" implemented by solid state switching devices.

PLC's differ from conventional computers both in their reliability and flexibility. In this latter regard, PLC's are normally constructed in modular fashion to allow them to be easily reconfigured to meet the demands of the particular process being controlled. For example, the processor and I/O circuitry are normally constructed as separate modules that may be inserted in a chassis and connected together through a common backplane using permanent or releasable electrical connectors. This modular, backplane construction allows, for example, varying the number of I/O modules as needed for the particular controlled process. The modular backplane also allows network cards to be attached to the backplane, for example, to communicate over a control network with additional remote I/O modules.

While PLC's have largely replaced systems composed of discrete interconnected relays for all but the smallest control systems, an exception exists in so-called safety applications. Safety applications are those in which failure of the control system could lead to significant hazard or injury. Safety systems, for use in such safety applications, may employ multiple redundant channels with monitoring and verification and may incorporate combinations of safety relays, sensors, and actuators, each with separate sets of interconnected wiring and cross-wiring to check for discrepancies between signal paths. The wiring of the safety system is done to move the safety system to a predetermined safe state if either of the redundant channels fails and or do not agree.

Such discrete safety systems can be costly to install and maintain, especially for complex control applications, where large amounts of point-to-point wiring is required both to implement the logic and to provide the redundant channels. For this reason, there is considerable interest in using PLC's, where the logic is implemented in a computer rather than as device interconnections, to provide similar levels of safety operation.

In one such approach to implementing a safety system with an PLC, duplicate PLCs are connected to sensors and actuators using separate signal paths to each. Each PLC and its associated I/O represents an independent control channel and the controllers are cross-wired so that the failure in either one may be detected and a safe state maintained For example, referring to FIG. 1, a prior art safety system may be implemented with duplicate PLC 10a and 10b. Each of the PLCs 10a and 10b may receive input signals from a multiple sensors or contact switches 14 along redundant input leads 16a and 16b received by input modules 24a and 24b respectively and may provide redundant output signals (from output modules 25a and 25b) along leads 18a and 18b to actuator 20. Both of signals 18a and 18b must be the same for the actuator 20 to be actuated. The output modules 25a and 25b may include internal testing and diagnostics, otherwise the status of outputs 18a and 18b may be monitored by inputs of input module 24a and 24b so that output faults can be detected.

Each of the PLC's 10a and 10b include a chassis 12a and 12b holding one of separate control modules 22a and 22b executing a redundant control program. The redundant control programs may be essentially identical or may be different control program intended to provide the same control outputs. Control module 22a and I/O modules 24a and 25a communicate on backplane 40a, while control modules 22b and IPO modules 24b and 25b communicate on backplane 40b. Each backplane 40a and 40b is associated with one of chassis 12a and chassis 12b and communicates with its respective modules by electrical connectors (not shown). The backplanes 40a and 40b are supplied with power from power supplies 32a and 32b and include diagnostic circuitry to detect failures and go to a predetermined safe state.

Cross-wiring 26 between I/O modules 24a and 24b allows each PLC 10a and 10b to review the other's inputs and outputs for disparity and testing if necessary. If a disparity or failure is detected, the control programs cause the controllers and their outputs to go into a safe state predefined according to the control application.

While this system provides the ability to detect and respond to failures, the cross-wiring can be costly to implement and maintain, especially for complex control applications. The need for duplicated hardware, including racks and backplanes, further increases the costs.

SUMMARY OF THE INVENTION

The present invention provides a safety system using duplicate PLCs and modules but providing substantially reduced wiring and, in certain embodiments, substantially reduced hardware costs.

The present inventors have recognized that in certain cases physical wiring may be replaced with equal safety through "virtual" wiring implemented on a single unitary backplane of the PLC. Thus, physical cross-wiring may be eliminated in favor of backplane messages.

In order that the virtual wiring provide the same level of safety as the physical wiring, a "connected" communication protocol must be used which both ensures reliable transmission of messages through pre-established connections and which detects failure of the virtual wiring represented by a connection. Generally, connected messaging systems require opening of connections to reserve necessary bandwidth and other network resources needed by the connection. After being opened, the connection may implement any of a variety of features to ensure the integrity of the connection including message echoing and comparison, I/O broadcast and verification of results or the regular transmission of a heart beat signal. Each connection becomes a virtual wire that mimics physical wire, but unlike a physical wire, the virtual wire is a fail safe component since each connection contains the redundancy and verification that would send the outputs to a safe de-energized state in the event of a connection anomaly such as a wire break or connection device failures.

Through the use of the reliable virtual wiring of connections, the actual physical wiring required to implement a safety system is much reduced as well as the number of I/O points. The ability to use a single backplane may allow the entire safety system to be implemented in a single chassis as opposed to duplicate chassis. Support of multicast/broadcast communications allows the messages implementing the cross wiring required for redundancy, monitoring and verification to be simultaneously transmitted to multiple devices, reducing the burden on network bandwidth.

Specifically, then, the present invention provides a PLC for safety applications including a backplane that may allow connection to at least two I/O modules and a first and second control module. The backplane, I/O modules, and control modules include communications circuitry supporting a connected communications protocol in which failure of a connection between modules may be detected by the modules. This connected communications protocol may, but need not, provide a producer/consumer broadcast messaging which allows the sharing of input and output information over the single backplane.

Each of the first and second control modules redundantly execute a control program to: (i) open connections over the backplane with the at least two I/O modules; (ii) receive over connections, redundant input signals from the I/O modules; (iii) generate a redundant output signal based on the received input signals; and (iv) transmit over a connection the redundant output signal to at least one I/O module.

Thus, it is one object of the invention to provide the safety benefits of redundant physical wiring for inputs using virtual connections which embody the safety features of actual wires. In this way, each controller can incorporate logic to analyze each other's inputs simultaneously to ensure they are in agreement.

It is another object of the invention to provide a safety system that may be implemented on a single logical backplane supporting connected and redundant messaging.

Each given first and second control module further redundantly execute the control program to: (v) receive over a connection, the redundant output signal of the other control module (for example, by using an output echo); (vi) compare the redundant output signal of the given control module and the other control module; and (vii) enter a predefined safety state when the result of the comparison is that the signals do not match.

It is thus another object of the invention to internalize the cross-wiring previously necessary to implement safety systems, eliminating the cost of physical cross-wiring. The cross wiring allows checking that all inputs agree and that all outputs agree to determine failures and where the failure has occurred.

The given control module may receive the output signal of the other control module via a connected message from an output module.

Thus one feature of the invention allows the output of the other controller to be checked directly, without intervention by the other controller.

The backplane may be a unitary circuit board or two co-planar circuit boards.

Thus, it is another object of the invention to provide for more compact implementation of the safety system that may reduce hardware costs.

More than one circuit board may be interconnected to provide a single logical backplane. The circuit boards may communicate between each other via a pair of network cards, one connected to each circuit card and joined by network media, the network cards providing a protocol supporting the connected communications protocol.

It is another object of the invention to permit the size of the safety system to be arbitrarily expanded beyond the confines of a single physical chassis using standard industrial control networks providing for high reliability communication protocols.

The connected communications protocol may detect failure of a connection between modules by echoing messages transmitted from a first module to a second module back to the first module or may detect failure of a connection between modules by detection of the absence of a heartbeat signal over a connection for more than a predetermined period of time.

The I/O module may provide self-diagnostics and the communication protocol may indicate a failure of a connection when the self-diagnostics indicate a failure of the I/O module.

It is thus another object of the invention to employ positive indication of connection failure so that a safety state may be adopted.

It is another object of the invention to expand the concept of connection failure to include failures of components used in the safety system.

The communication protocol may support multicasting or broadcasting of messages transmitted over a connection, for example, by using a producer consumer protocol.

It is thus another object of the invention to allow for the multiplication of backplane messages that cross-connections imply without unduly taxing the backplane capacity, especially for complex systems.

The foregoing objects and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE PREFERRED EMBODIMENT

Figure 2:
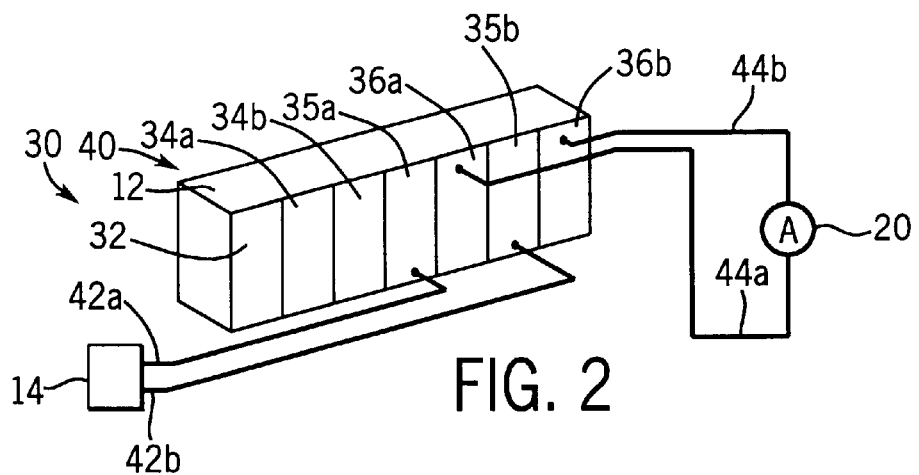
FIG. 2 is a figure similar to that of FIG. 1 showing implementation of the safety system in a first embodiment of the present invention using a single chassis with dual control modules and four I/O modules and using the virtual wiring via backplane messages.

Referring now to FIG. 2, a safety programmable logic controller PLC 30 constructed according to the present invention may include a power supply module 32, a first and second control module 34a and 34b and a first and second output module 36a and 36b and a first and second input module 35a and 35b housed in a single chassis 12 and intercommunicating on a common backplane 40.

Figure 1:
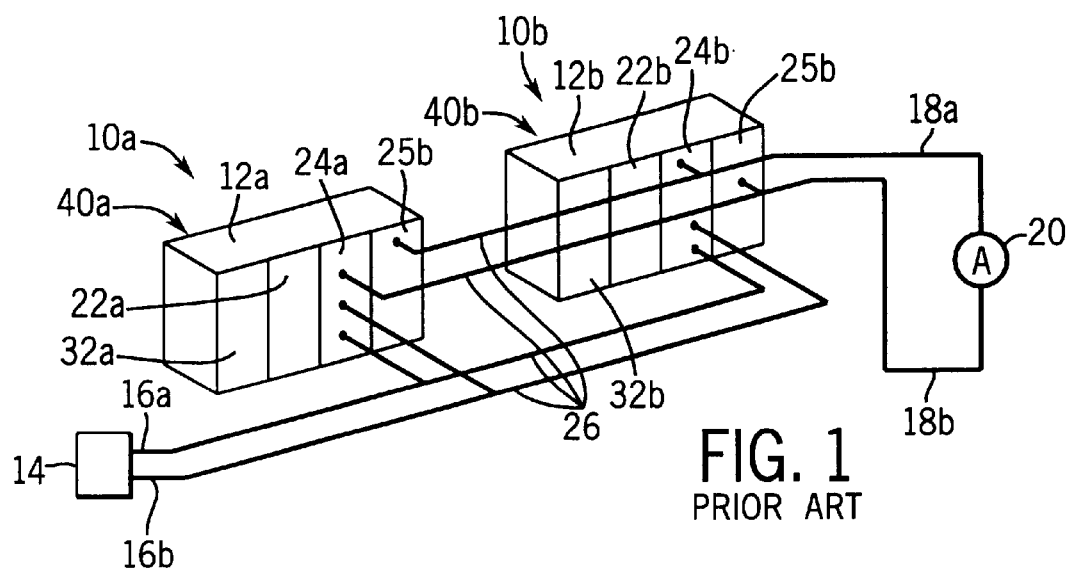
FIG. 1 is a simplified perspective view of a prior art safety system implemented using two PLC systems of standard design having two chasses, each with a controller module and two I/O modules.

The input module 35a may, in an example application similar to that described with respect to FIG. 1, receive an input signal along line 42a from switch 14. The input signal is processed by control module 34a which may produce an output signal communicated to output module 36a which may send command along line 44a to actuator 20. Similarly, input module 35b may receive an input signal along line 42b from switch 14 which may be processed by control module 34b to produce an output signal, via output module 36b along line 44b to the actuator 20. The switch 14 has duplicate contacts associated with each of lines 42a and 42b and the actuator 20 is connected to lines 44a and 44b so as to function only when both lines 44a and 44b contain the same signal.

Figure 3:
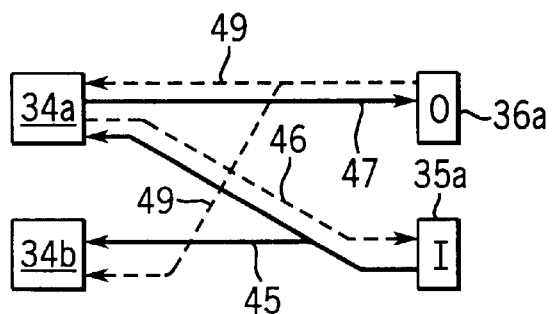
FIG. 3 is a schematic representation of a backplane message between two of the modules of FIG. 2 showing close loop messaging implemented in one example by message echo and in another example by the use of a heartbeat signal as a means for both controller modules to confirm the other is present and that the connection is valid.

Referring now to FIG. 3, each of the modules 34, 35, and 36 may communicate over the backplane 40 using a connected messaging protocol. Connected messaging refers to a protocol in which, before communication between any modules 34, 35 and 36, a connection must be opened to ensure that necessary a system resources including buffer space and network bandwidth are available. As such, pre-opened connections serve to ensure that the intended message traffic can be accommodated reliably without undue delay.

In a preferred embodiment, the connected messaging system also follows a producer-consumer model. The producer consumer model refers to a system in which data packets sent over connections are identified by abstract connection number rather than, for example, the identity of the source or destination. Accordingly, under the producer-consumer model, multicasting or broadcasting may be easily performed without additional network traffic by assigning a number of consumers with a single connection number. Each consumer reviews the connection number of all backplane message traffic to determine whether it should accept the message.

A suitable communications protocol for the backplane 40 is the Control and Information Protocol (CIP) whose open standards are promulgated and managed by the Open DeviceNet Vendor Association (ODVA) having headquarters in Boca Raton, Fla. CIP is an application layer that is common to the open standards of ControlNet, DeviceNet, or EtherNet/IP and thus may be implemented on a variety of commercially available networks. Other connected protocols may also be used.

It is important that the communication protocol unambiguously identify whether the connection is valid, that is, whether the messages being transmitted on the connection are being received. Referring now to FIG. 3, this certainty may be provided by a variety of techniques each of which provides a cyclic closed loop communication. A first technique is that of sending a cyclic or periodic input message 45 and corresponding "heartbeat" message 46 on each open connection between a control modules 34 and input I/O modules 35. Failure of either message 45 or 46 to be received within the predefined time interval indicates a connection failure and may be used to cause the modules associated with the connection to enter a predefined safety state.

Referring still to FIG. 3, in a second technique, termed output echoing, a message 44 is cyclically sent over the backplane 40 from each control module 34 to a to its associated output modules 36, and triggers upon receipt by output module 36 the transmission by output module 36 of an echo message 49 containing the received data and diagnostic data back to the control module 34. The echo message 49 thus verifies that the data of the message 47 was properly received. The module 34, upon receipt of the echo message 49 compares the echo message 49 to the transmitted message 47 and, if there is a discrepancy, triggers the controller 34 to enter a predefined safety state where the outputs are de-energized.

The diagnostic data included in the echo message allows the checking of a valid connection to be extended to ensuring proper operation of the modules themselves. The output modules 36, for example, may include a pulse test for self-testing their outputs. In the pulse test, the output state of the output module 36 is changed for an extremely short duration, shorter than the response time of the physical actuator 20, in order to test that it can change state and is not shorted or otherwise damaged. Detection of I/O fault may be communicated to both the control module 34 having predefined "ownership" of the failed output modules 36 and another other control module 34 acting as a monitor. Both the messages 45 and 49 may make use of multicasting or broadcasting.

Each of these cyclic closed loop communication techniques ensures that the connection is as reliable as a physical wire as far as knowing that the information has been reliably transmitted. As will now be described, the connected communication protocol, effected by the backplane 40 and the modules 34a and 34b, 35a and 35b, and 36a and 36b, eliminates the cross-wiring 26 of I/O of FIG. 1, required in the prior art to share I/O states by using the backplane 40 and producer/consumer messaging to share and then compare I/O information.

Figure 4:
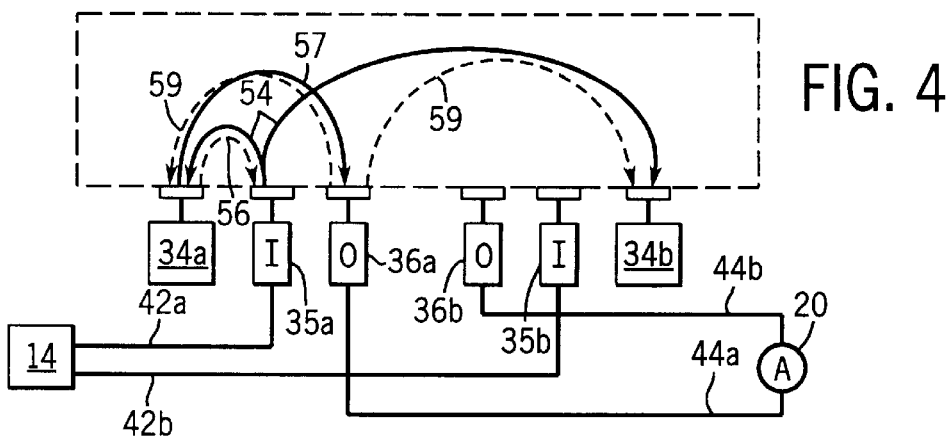
FIG. 4 is a graphical representation of the backplane messages sent to or from one set of I/O modules of the present invention showing multicasting/broadcasting of inputs and output echoes.

Referring now to FIG. 4, the producer-consumer model allows the number of messages needed to implement the cross-wiring 26 to be reduced. The ability to multicast can be important for complex control systems with much cross-wiring 26 and given the multiple communications in echoes that occur with each transaction. In the present example, each input module 35a and 35b will communicate input from switch 14 to both control modules 34a and 34b (four paths of communications) with just two messages. Thus signal 42a from switch 14 is received by input module 35a and multicast by message 54a to control module 34a and 34b. Similarly (but not shown for clarity), signal 42b going to input module 35b is multicast to both control modules 34a and 34b. Heartbeat 56 from controller 34a allows the input module 35a to verify that the controller 34a is still working properly.

Similarly, an output message from control module 34a is sent to output module 36a The output module 36a then multicasts this output data in its output echo to both controllers 34*a* and 34*b*. A similar communication (not shown for clarity) occurs between control module 34*b* and output module 36*b* and control module 34*a*.

In these cases, the receiving control modules 34*a* and 34*b* operate in "Listen Only" mode in receiving the inputs 54 and echo signals 59. In this way, each control module 34*a* and 34*b* may receive the status of the input and output of the other control module directly from the input modules and output modules without the intervention of the other control module.

Figure 8:
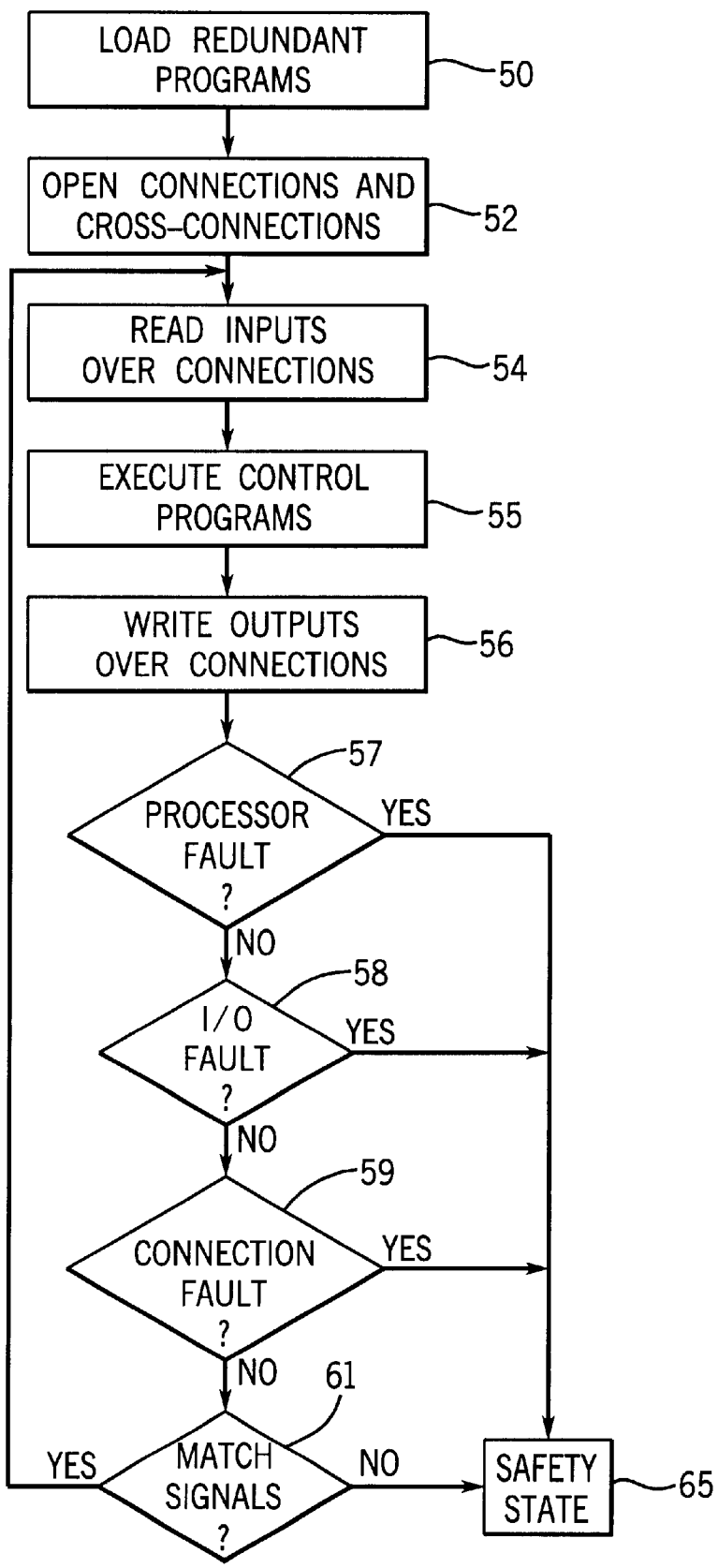
FIG. 8 is a flow chart showing an operation of the modules in executing a control program under the present invention.

Referring now to FIGS. 2, 4 and 8, the safety PLC 30 is initialized by loading redundant control programs into control modules 34*a* and 34*b* as indicated by process block 50 of FIG. 8. These control programs generally implement the logic of the control process, which may vary from application to application, but also include logic for comparison of inputs and outputs via the cross-wiring 26, as has been described, and further include the necessary logic for entering into a safety state when a fault or failed condition has occurred.

At succeeding process block 52, the cross-wiring 26 of the prior art is implemented through opening of cross-connections between the various modules 34 and 36 as have been described with respect to FIG. 4.

At process block 54, any inputs signals (e.g. 42) are received from the input modules 35 to be processed by the control programs in control modules 34*a* and 34*b* per process block 55. Any output messages are sent to the output modules 36 communicating with the control modules 34 via the backplane 40. In the present example, inputs are received along lines 42*a* and 42*b* from switch 14, and sent by multicasts 54*a* and 54*b* from input modules 35*a* and 35*b* to control modules 34*a* and 34*b*. Outputs from control modules 34*a* and 34*b* are sent to the output modules 36*a* and 36*b* by 57*a* and 57*b* and then transmitted along lines 44*a* and 44*b* as indicated by process block 56

Concurrently (but shown successively) with this execution and sending of messages, the network protocol checks for four conditions indicated by decision blocks 57, 58, 59, and 61 . First as indicated by decision block 57 any processor faults within the control modules 34 are detected. Processor faults may be detected by conventional means known in the prior art including, but not limited to, the polling of a watchdog timer. Second, as indicated by decision block 58, I/O module faults are detected, for example, using the pulse tests as described above. Third, as indicated by decision block 59 the connection health is determined, for example, by confirming the periodic arrival of a heartbeat signal within a predetermined window to ensure the connection is alive and for each message by comparing the message against an echo signal to determine that a transmitted message was correctly received. Fourth, as indicated by decision block 61 input and output signal matching is confirmed per the cross-connections that imitate the cross-wiring 26 used in conventional safety systems.

For each of the decision blocks 57, 58, 59, and 61, failure of the condition results in the controller assuming the safety state and transmitting to its owned I/O, they should enter the safety state 65. Otherwise, the data transmission and program execution of process blocks 54, 55, and 56 is continued. In addition the I/O module may detect a failure in its corresponding controller (e.g. connection timeout) and then may choose to also assume a safe state (e.g. deenergize outputs).

Figure 5:
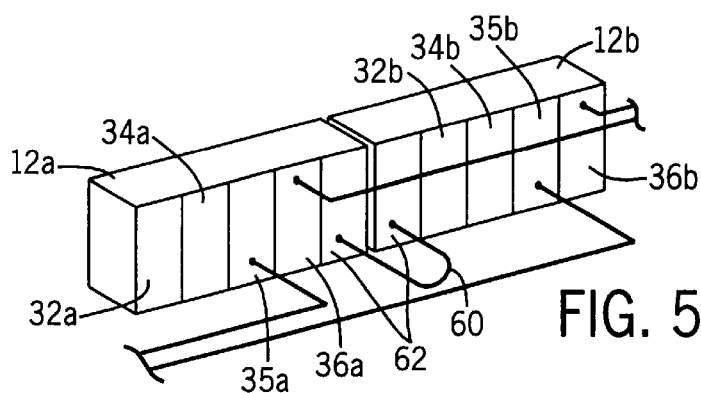
FIG. 5 is a figure similar to that of FIG. 2 showing a second embodiment of the invention with two separate chasses providing side-by-side backplanes connected logically by network cards to form a single logical backplane.
Figure 7:
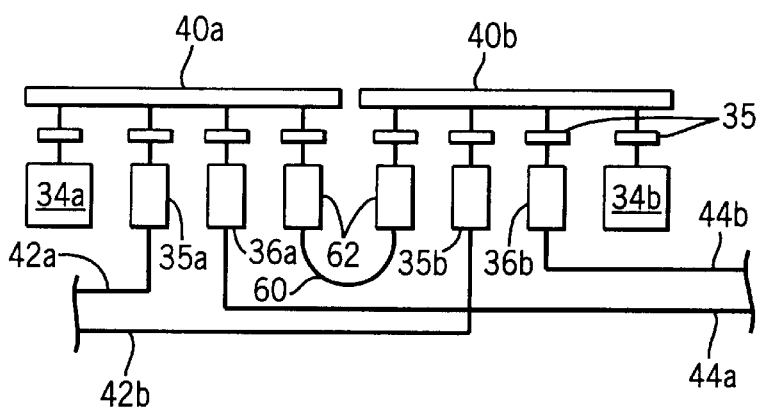
FIG. 7 is a schematic representation of the embodiments of FIGS. 5 and 6 showing interconnection of separate backplanes into a single logical backplane through the use of two network cards joined by a compatible network medium.

Referring now to FIGS. 5 and 7, the ability to create virtual cross-wiring 26 on the backplane 40 does not require a single backplane 40 but rather two backplanes 40*a* and 40*b* may be employed through the use of two controller chasses 12*a* and 12*b*, here attached together in side-by-side configuration. This embodiment differs from the prior art of FIG. 1 because even though the backplanes 40*a* and 40*b* are physically separate, they are logically unified through the use of an interconnecting network medium 60 joining two network cards 62, one associated with each of the backplanes 40*a* and 40*b* and plugged into the backplane 40 by a connector 35. The network cards 62 and medium 60 must support the connected messaging described above so as to preserve the integrity of the virtual wires created by messages over the network medium 60. This is a relatively simple matter for the preferred protocol of CIP which may exist as an application layer on relatively common network protocols such as Ethernet. A network connection realized as described allows the virtual wires of the present invention to pass unhindered between physically separate backplanes 40*a* and 40*b*.

Figure 6:
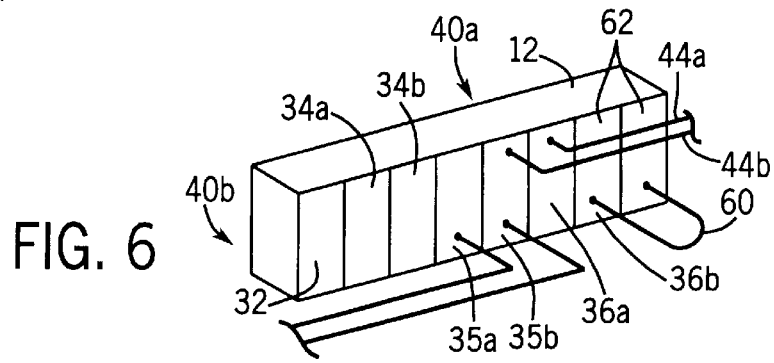
FIG. 6 is a figure similar to that to FIG. 5 showing a third embodiment of the invention using split co-planar backplanes connected by network interface cards.

Referring now to FIGS. 6 and 7, in a similar manner, the two backplanes 40*a* and 40*b* may be placed at the back of a single chassis 12 in split or overlapping form so as to provide the same interconnection through network cards 62 and the network medium 60. For FIGS. 5–7 even though a given controller and its associated pair of I/O modules are shown in the same physical backplane, it is not limited to this case and is not limited to only two physical backplanes. Since the network cards support the same communications protocol as the backplane and create a single logical backplane, any module may reside in any physical backplane. This allows for the I/O to be either "local" or "remote" to its associated controller.

It will be understood from the above description, that the present invention is applicable to systems having additional redundancy, for example, systems having three or more control modules each supporting cross-connections with the others. The ability to multicast or broadcast cross-connection messages, makes scalability to larger numbers of controllers possible.

As used herein, the term "programmable logic controller" should be understood to embrace generally systems for control of processes and equipment and thus to include other similar terms such as industrial controller and the like. Further, broadcasting should be understood to include multicasting techniques as well. Generally, the terms safety and safety system, as used herein refers to a system that has met certain regulatory requirements for systems having improved ability to detect failure and to respond by moving to a user defined safety state. The successful implementation of a safety system depends on proper programming of the control program and definition of the safety state as well as proper selection of the sensors and actuators and wiring of the same, activities normally not under the control of the manufacturer. It will be understood that while the goal of a safety system is to improve the level of safety in a control system, that no control system can ensure safety and that other procedures including training of personnel and proper supervision of the process environment will be necessary.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A programmable logic controller for safety applications comprising:

a backplane;

at least two I/O modules electrically connectable to the backplane;

first and second control modules electrically connectable to the backplane;

wherein the backplane, I/O modules and control modules include circuitry supporting a connected communications protocol in which failure of a connection between modules may be detected by the modules;

wherein each of a given first and second control modules redundantly execute a control program to:
(i) open connections over the backplane with the at least two I/O modules;
(ii) receive over connections, redundant input signals from the I/O modules;
(iii) generate a redundant output signal based on the received input signals; and
(iv) transmit over a connection the redundant output signal to at least one I/O module.

2. The programmable logic controller of claim 1 wherein each given first and second control module further redundantly executes the control program to:
(v) receive over a connection, the redundant output signal of the other control module;
(vi) compare the redundant output signals of the given control module and the other control module; and
(vii) enter a predefined safety state when the result of the comparison is that the signals do not match.

3. The programmable logic controller of claim 1 wherein the given control modules receive the output signal of the other control module via a connected message from an output module.

4. The programmable logic controller of claim 1 including the I/O modules include two input modules and two output modules and wherein each given control module opens connections over the backplane with the two input modules to receive the redundant input signals from the two input modules and wherein each of the given control modules transmits the redundant output signal to a different output module.

5. The programmable logic controller of claim 1 wherein the backplane is a unitary circuit board.

6. The programmable logic controller of claim 1 wherein the backplane is more than one circuit board interconnected to provide a single logical backplane.

7. The programmable logic controller of claim 6 wherein the circuit boards are substantially co-planar.

8. The programmable logic controller of claim 6 wherein circuit boards communicate between each other via a pair of network cards one connected to each circuit card and joined by network media, the network cards providing a protocol supporting the connected communications protocol.

9. The programmable logic controller of claim 1 wherein the connected communications protocol detects failure of a connection between modules by echoing messages transmitted from a first module to second module and comparing the echoed message to the message transmitted.

10. The programmable logic controller of claim 1 wherein the connected communications protocol detects failure of a connection between modules by detection of the absence of a heartbeat signal over a connection for more than a predetermined period of time.

11. The programmable logic controller of claim 1 wherein the communication protocol supports broadcasting of messages transmitted over a connection.

12. The programmable logic controller of claim 1 wherein the communication protocol is a consumer/producer protocol.

13. The programmable logic controller of claim 1 wherein the output signals are binary signals having a predefined first and second states; the programmable logic controller further including a controlled device receiving redundant output signals from the at least one I/O module to enter an actuated state only when the output signals are both in the same state and to enter a predefined safety state when the output signals are of different states.

14. The programmable logic controller of claim 1 including further an input device providing identical redundant input signals to the at least one I/O module based on a single actuation condition.

15. The programmable logic controller of claim 1 wherein the at least one I/O module provides self-diagnostics and wherein the communication protocol may indicate a failure of a connection when the self-diagnostics indicate a failure of the I/O module.

16. The programmable logic controller of claim 15 wherein the output signals from the at least one I/O module are switch outputs providing either an open or closed path of conduction and wherein the self-diagnostics check whether an output of the I/O module is shorted.

17. The programmable logic controller of claim 15 wherein the connected communications circuitry of the backplane, I/O module and control modules cause indication of a fault condition when redundant input signals or redundant output signals do not match.

18. A method of implementing a safety system on a programmable logic controller having a backplane, at least one two I/O modules electrically connectable to the backplane, and a first and second control modules electrically connectable to the backplane, wherein the backplane, I/O modules and control modules include circuitry supporting a connected communications protocol in which failure of a connection between modules may be detected by the modules, the method comprising, for each given control module, the steps of:
(i) opening connections over the backplane with the at least two I/O modules;
(ii) receiving over connections, redundant input signals from the I/O modules;
(iii) generating a redundant output signal based on the received input signals; and
(iv) transmitting over a connection the redundant output signal to at least one I/O module.

19. The method of claim 17 further including, for each given controller, the steps of:
(v) receiving over a connection, the redundant output signal of the other control module;
(vi) comparing the redundant output signals of the given control module and the other control module; and
(vii) entering a predefined safety state when the result of the comparison is that the signals do not match.

20. The method of claim 19 wherein the given control modules receive the output signal of the other control module via a connected message from an output module.

21. The method of claim 17 including the I/O modules include two input modules and two output modules and wherein each given control module opens connections over the backplane with the two input modules to receive the redundant input signals from the two input modules and wherein each of the given control modules transmits the redundant output signal to a different output module.

22. The method of claim 17 wherein the backplane is a unitary circuit board.

23. The method of claim 17 wherein the backplane is more than one circuit board interconnected to provide a single logical backplane.

24. The method of claim 23 wherein the circuit boards are substantially co-planar.

25. The method of claim 23 wherein circuit boards communicate between each other via a pair of network cards one connected to each circuit card and joined by network media, the network cards providing a protocol supporting the connected communications protocol.

26. The method of claim 17 wherein the connected communications protocol detects failure of a connection between modules by echoing messages transmitted from a first module to second module and comparing the echoed message to the message transmitted.

27. The method of claim 17 wherein the connected communications protocol detects failure of a connection between modules by detection of the absence of a heartbeat signal over a connection for more than a predetermined period of time.

28. The method of claim 17 wherein the communication protocol supports broadcasting of messages transmitted over a connection.

29. The method of claim 17 wherein the communication protocol is a consumer/producer protocol.

30. The method of claim 17 wherein the output signals are binary signals having a predefined first and second states; the programmable logic controller further including a controlled device receiving redundant output signals from the at least one I/O module to enter an actuated state only when the output signals are both in the same state and to enter a predefined safety state when the output signals are of different states.

31. The method of claim 17 including further an input device providing identical redundant input signals to the at least one I/O module based on a single actuation condition.

32. The method of claim 17 wherein the at least one I/O module provides self-diagnostics and wherein the communication protocol may indicate a failure of a connection when the self-diagnostics indicate a failure of the I/O module.

33. The method of claim 30 wherein the output signals from the at least one I/O module are switch outputs providing either an open or closed path of conduction and wherein the self-diagnostics check whether an output of the I/O module is shorted.

34. The method of claim 30 wherein the connected communications circuitry of the backplane, I/O module and control modules cause indication of a fault condition when redundant input signals or redundant output signals do not match.

* * * * *